April 8, 1930.  A. G. BOLDRIDGE  1,754,007
AIRCRAFT
Filed July 8, 1927   2 Sheets-Sheet 1
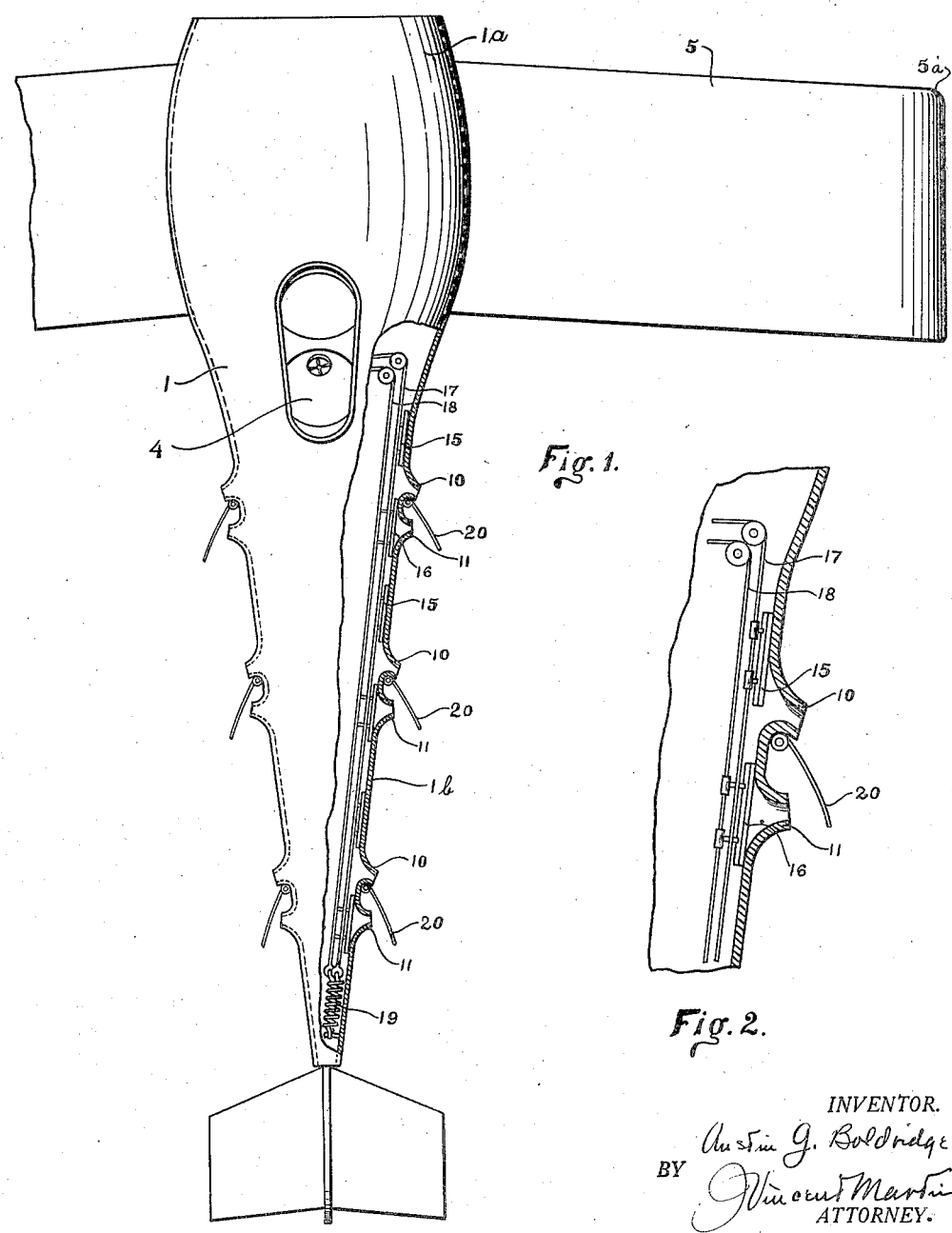
INVENTOR.
Austin G. Boldridge
BY Vincent Martin
ATTORNEY.

April 8, 1930.  A. G. BOLDRIDGE  1,754,007
AIRCRAFT
Filed July 8, 1927  2 Sheets-Sheet 2

INVENTOR.
Austin G. Boldridge
BY
Vincent Martin
ATTORNEY.

Patented Apr. 8, 1930

1,754,007

UNITED STATES PATENT OFFICE

AUSTIN G. BOLDRIDGE, OF HOUSTON, TEXAS

AIRCRAFT

Application filed July 8, 1927. Serial No. 204,264.

This invention relates to aircraft, and has for its object to provide a new and improved flying machine.

Perhaps one of the most serious objections to the aeroplanes now in use is the inability thereof to safely land and take off at low speeds. The modern aeroplane must approach its destination at a very high rate of speed, and, consequently, in landing, it must define a small angle of descent and thereafter race over the field before coming to a stop. In taking off, it must race down the field a great distance before ultimately leaving the ground to again define a small angle in its ascent.

This invention has for its principal object the provision of an aircraft which is capable of landing and taking off at comparatively low speeds.

A more specific object of the invention is to provide means whereby the air pressure created by the propeller of an aeroplane may be utilized for the guidance, balance, elevation, and speed regulation of an aeroplane.

A further object of the invention is to provide a new and improved armored aircraft.

Various other objects will hereinafter appear.

Figure 3:
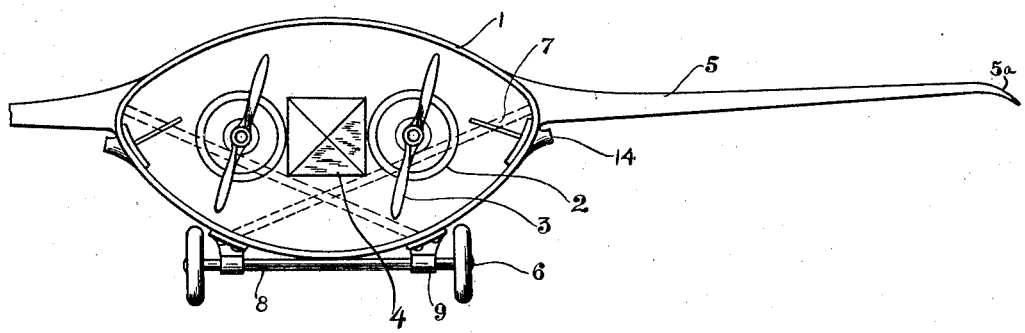
Figure 4:
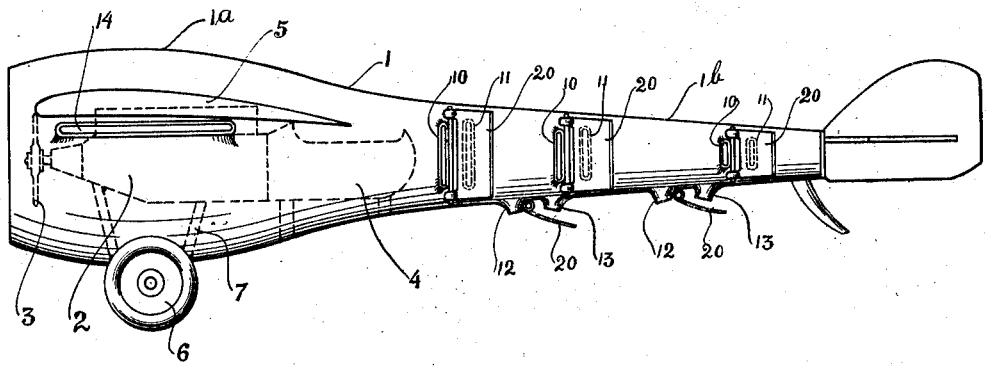

In the accompanying drawings, which are illustrative of the preferred embodiments of the invention, Fig. 1 is a fragmentary top plan view of the aeroplane with a part of the casing removed to disclose the respective side air ports and valves; Fig. 2 is a detail of the ports and valves; Fig. 3 is a fragmentary front elevation of an embodiment wherein the cockpit is within the casing; and Fig. 4 is a side elevation of the embodiment shown in Fig. 3.

Referring specifically to the drawings, the aeroplane disclosed therein comprises a casing or shell 1, substantially elliptical in cross-section and having a rounded body portion 1a and a tapering tail portion 1b. In Figs. 3 and 4, the engines 2, propellers 3 and cockpit 4 are mounted within the casing 1, and the wings 5 and running gear 6 are mounted upon said casing. In the construction illustrated in Fig. 1, the parts are likewise mounted, except that the cockpit 4 is mounted upon the top of the casing 1.

The engines 2 are supported within the casing by suitable braces 7. And the cockpit 4 is either supported as in Figs. 3 and 4, or upon the top of the casing as in Fig. 1. The casing rests directly upon the axle 8 of the running gear 6, which is mounted thereon by bearings 9.

The casing may be made of any light metal, and if the aeroplane be used in military operations, of bullet-proof metal, the cockpit being placed within the casing as in Fig. 1 for the protection of the aviator.

From the foregoing, it will be apparent to those skilled in the art that the casing provides a strong support for the wings, engine and cockpit, rendering unnecessary the employment of the vast number of supporting devices now in use. And it will also be observed that a plane so constructed may be used for combat purposes, all of the vital parts thereof being protected by the casing.

Attention is now called to the fact that both the movement of the aeroplane through the air, and the rotation of the propellers will produce a rush of air into the front end of the casing. The velocity of this air is slightly reduced by the enlarged body portion 1a, and then progressively and greatly increased by the tapering tail portion 1b. It will be understood by those skilled in the art that the reduction of the velocity of the air current in the enlarged portion 1a will be attended by a reduction of the resistance offered by the engines and cockpit to the movement of the aeroplane.

To regulate the passage of the air current through the casing, a plurality of elongated ports 10, 11 are provided on the sides thereof, similar ports 12, 13 on the bottom thereof, and a port 14 under each of the wings 5 thereof, all of said ports being controlled by suitable valves. Referring particularly to Figs. 1 and 2, it will be observed that the ports 10 and 11 are respectively provided with valves 15 and 16. The valves 15 are connected together and controlled by a cable 17 and the valves 16 by a cable 18. Suitable springs 19 may be provided in the tail end of the plane to normally hold said valves open by drawing the cables 17 and 18 toward the tail of the casing. The other ends of the cables extend into the cockpit to be adjustably secured therein in any suitable manner. It will be obvious that the valves are opened by overcoming the resistance of springs 19 and drawing the cables toward the cockpit. By the means shown, all of valves 10 may be opened and closed by the cable 17, and all of valves 11 by the cable 18. Various other valve operating means may be substituted for the means shown, whereby any one of the valves is independently operable.

The bottom ports 12, 13, and the wing ports 14 are likewise provided with valve operating means.

Intermediate each pair of air ports, a blade 20 is pivoted as shown for limited movement. The air discharged by said ports impinges upon this blade.

The operation and function of the invention may briefly be outlined as follows:

A quick taking off of the craft may be effected by opening all of the valves. When the engines are raced, the propellers produce a swift current of air in the casing which escapes through the various ports. The air escaping through wing ports 14 will impinge upon the bottom surface of wings 5, which may be turned downwardly as at 5ª. This portion of the air, together with that escaping through bottom ports 12, will produce an upward pressure the degree of which will be proportionate to the revolutions per minute of the propellers. If such pressure is per se sufficiently great, the aeroplane will thereby be lifted off the ground. If not, the elevation thereof will be effected by the pressure under the wings created by the forward movement of the plane combined with the pressure of the air passing through the casing.

Furthermore, the propellers will be assisted in moving the aeroplane forward by the discharge of air through the ports 10, 11 and 13, the passage outwardly and backwardly of the air discharged by ports 10 being unobstructed, and the air discharged outwardly and forwardly by the ports 10 and 13 impinging upon the pivoted blades 20. The aeroplane is thus enabled to take off after moving forward a very short distance and to take the air at a greater angle of ascent.

After the aeroplane is in the air, the guidance and speed thereof may efficiently be controlled by manipulation of the valves. Thus the ports on the right side may be closed, whereupon the air discharged by the ports on the left side and impinging upon the respective blades will produce a movement of the aeroplane toward the left. The pressure of the air discharged by the ports on the left side will be greatly increased by the closure of the ports on the right side. Again, by the arrangement shown, all of ports 11 on one side may be closed and ports 11 left open to produce a different movement. And, as heretofore pointed out, means may be provided whereby each individual valve is independently operable, and various movements may thereby be produced. This means of control will be found particularly useful when strong winds are encountered.

To elevate or lower the nose or tail of the aeroplane, the ports 14, 12 and 13 may in an obvious manner be alternately opened and closed.

The aeroplane having completed its flight, and having reached a position immediately above its destination, all of the ports, except the ports 14, may be closed, whereby forward speed will be greatly diminished; and the pressure of the air discharging from ports 14, greatly increased by the closure of the other valves, will prevent a too rapid precipitation.

To prevent a too abrupt diminution of speed, the ports may be gradually or partially closed, or a number thereof closed and the remainder left open. Various adjustments will occur to those skilled in the art.

Thus, by various adjustments of the means described, an aeroplane may be made to land at a low speed and at a greater angle of descent.

Stated differently: The planes now in use must be operated so that in landing and in taking off, they define a line which is very nearly tangential to the surface of the earth; whereas, this invention provides a machine, the construction of which is such that it may safely be landed and taken off in a substantially radial line.

Various uses of the invention in connection with machines other than aeroplanes will be apparent to those skilled in the art, and it is, therefore, to be understood that the construction and use shown and described herein are merely illustrative of the preferred embodiment of the invention, and that many changes may be made without departure from the scope of the following claims.

I claim:

1. An aircraft having a casing substantially conical in form, the base or front end of said casing being open, said casing having longitudinal ports opening laterally and upwardly, and additional ports in its sides and bottom, laterally extending wings on said casing immediately above said longitudinal openings, the tips of said wings being presented downwardly and outwardly, a propeller positioned within said casing to direct air through said ports, and valves to control the passage of air through said ports.

2. An aircraft having a casing substantially conical in form, the base or front end of the said casing being open, said casing having longitudinal ports opening laterally and upwardly, and additional ports in its sides and bottom, said additional ports being arranged in pairs, wings on said casing immediately above said longitudinal openings, the tips of said wings being presented downwardly and outwardly, a blade pivotally mounted on the exterior of said casing adjacent each pair of said additional ports, and valves to control the passage of air through said ports.

In testimony whereof, I hereunto affix my signature.

AUSTIN G. BOLDRIDGE.